US012448587B2

(12) United States Patent
Trombetta et al.

(10) Patent No.: US 12,448,587 B2
(45) Date of Patent: Oct. 21, 2025

(54) HARD SURFACE CLEANING COMPOSITION

(71) Applicant: Conopco Inc., Englewood Cliffs, NJ (US)

(72) Inventors: Ivana Trombetta, Casalpusterlengo (IT); Serena Pezzia, Casalpusterlengo (IT); Luca Pretali, Casalpusterlengo (IT); Lorena Galluzzi, Casalpusterlengo (IT)

(73) Assignee: Conopco Inc., Englewood Cliffs, NJ (US)

( * ) Notice: Subject to any disclaimer, the term of this patent is extended or adjusted under 35 U.S.C. 154(b) by 337 days.

(21) Appl. No.: 18/255,592

(22) PCT Filed: Dec. 2, 2021

(86) PCT No.: PCT/EP2021/084040
§ 371 (c)(1),
(2) Date: Jun. 2, 2023

(87) PCT Pub. No.: WO2022/122559
PCT Pub. Date: Jun. 16, 2022

(65) Prior Publication Data

US 2024/0010945 A1 Jan. 11, 2024

(30) Foreign Application Priority Data

Dec. 7, 2020 (EP) .................................... 20212150

(51) Int. Cl.

| | |
|---|---|
| ***C11D 1/00*** | (2006.01) |
| ***C11D 1/29*** | (2006.01) |
| ***C11D 1/90*** | (2006.01) |
| ***C11D 3/04*** | (2006.01) |
| ***C11D 17/00*** | (2006.01) |

(52) U.S. Cl.
CPC .................. *C11D 1/29* (2013.01); *C11D 1/90* (2013.01); *C11D 3/046* (2013.01); *C11D 17/0008* (2013.01); *C11D 2111/16* (2024.01); *C11D 2111/18* (2024.01)

(58) Field of Classification Search
None
See application file for complete search history.

(56) References Cited

U.S. PATENT DOCUMENTS

| | | | |
|---|---|---|---|
| 6,015,780 A | 1/2000 | Llosas Bigorra et al. | |
| 9,023,786 B2 | 5/2015 | Schmiedel et al. | |
| 10,047,321 B2 * | 8/2018 | Meier | C11D 11/0094 |
| 2002/0069900 A1 | 6/2002 | Evers | |
| 2006/0251602 A1 | 11/2006 | Goddinger et al. | |
| 2009/0036345 A1 | 2/2009 | Kulbick et al. | |
| 2018/0179468 A1 | 6/2018 | Meier et al. | |
| 2019/0024020 A1 | 1/2019 | Buisker et al. | |
| 2022/0064569 A1 | 3/2022 | Vinson et al. | |

FOREIGN PATENT DOCUMENTS

| | | |
|---|---|---|
| CN | 1075161 | 8/1993 |
| CN | 104263545 | 9/2014 |
| CN | 108841463 | 11/2018 |
| CN | 109337768 | 2/2019 |
| CN | 110139921 | 8/2019 |
| CN | 116529349 | 8/2023 |
| EP | 0193386 | 9/1986 |
| EP | 1074606 | 2/2001 |
| EP | 1167500 | 1/2002 |
| EP | 2304010 | 10/2017 |
| EP | 3670639 | 6/2020 |
| EP | 3670639 A1 | 6/2020 |
| GB | 2528693 | 2/2016 |
| JP | 2013082844 | 10/2011 |
| KR | 100481815 | 4/2005 |
| WO | WO9800498 | 1/1998 |
| WO | WO9925800 | 5/1999 |
| WO | WO16002522 | 6/2014 |
| WO | WO2016010501 | 1/2016 |
| WO | WO2016030226 | 3/2016 |
| WO | WO17144677 | 8/2017 |
| WO | WO2018095695 | 5/2018 |
| WO | WO 2020/126592 A1 | 6/2020 |
| WO | WO 2020/126601 A1 | 6/2020 |
| WO | WO2020126592 | 6/2020 |
| WO | WO2020126601 | 6/2020 |
| WO | WO2022122331 | 6/2022 |
| WO | WO2022122332 | 6/2022 |
| WO | WO2022122480 | 6/2022 |
| WO | WO2022122559 | 6/2022 |

OTHER PUBLICATIONS

Yi et al; Progress in Fine Petrochemicals 03; 1999; 1999; 20-27.

* cited by examiner

*Primary Examiner* — Necholus Ogden, Jr.
(74) *Attorney, Agent, or Firm* — Ipsilon USA—NLO

(57) ABSTRACT

The present invention relates to liquid aqueous detergent compositions comprising a surfactant system comprising a primary surfactant being anionic surfactant, a secondary surfactant being amphoteric surfactant and polyethylene oxide whilst the surfactant system is free of alkylbenzene sulphonates and derivatives thereof. The invention further relates to a method of cleaning a stainless-steel hard surface using the composition of the invention, as well as the use thereof.

13 Claims, No Drawings

HARD SURFACE CLEANING COMPOSITION

FIELD OF THE INVENTION

The present invention relates to hard surface cleaning compositions, in particular liquid aqueous detergent compositions comprising polyethylene oxide and amphoteric surfactant, and a method and use comprising the same.

BACKGROUND OF THE INVENTION

Household cleaning activities involve the use of a detergent product and water to rinse off the detergent product and finish the cleaning process. These activities are typically performed daily, often more than once a day, such as dish washing. That is, hard surface cleaning, dishwashing and other household cleaning activities are time consuming activities and, ideally, can be optimized when using products with excellent detergency and soil removal capacity.

A cleaning product often comprises a surfactant system containing different types of surfactant to provide for cleaning efficacy. Therefore, some cleaning products contain a main surfactant, sometimes referred to as primary surfactant, and co-surfactant, sometimes referred to as secondary surfactant.

Consumers are sensitive to visual cues when using a cleaning product like for example a hand dish wash product. One of the more prominent visual cues is foam formation when cleaning as the amount of foam is seen as an indicator of cleaning performance. More foam is interpreted as more cleaning power. In addition to such ‘in-use’ visual cues, consumers are also sensitive to product appearance. Some consumers prefer clear and transparent product formulations. Over time, e.g. upon storage, product appearance may change and a clear and transparent product may for example develop sediment and/or become cloudy. The same may happen as a result of temperature changes.

Nowadays, some consumers prefer cleaning products with a good environmental profile. That is, they prefer products that are ‘eco-friendly’ and have less or no impact on the environment when the product is used but also when the product is manufactured. There are many cleaning products on the market that claim to be ‘eco-friendly’ or ‘natural’, but it is not always easy for consumers to understand what those positive terms really stand for. In addition, some consumers still associate ‘eco-friendly’ cleaning products with less efficacious cleaning products.

To address these developing consumer preferences, use of certain surfactants can be reduced or avoided altogether, like e.g. sulphonated surfactants like alkylbenzene sulphonates. Another way of addressing these consumer preferences is by lowering the total amount of surfactant in a product. However, these changes may require other ingredients to maintain cleaning efficacy. One such ingredient is polyethylene oxide.

In view of the above, there remains a need for a hard surface cleaning composition with a good environmental profile providing good emulsification and oily soil removal properties without compromising consumer satisfaction in terms of cleaning performance and/or product appeal.

SUMMARY OF THE INVENTION

We have found that liquid detergent formulations comprising polyethylene oxide and betaine may not be temperature stable but that a specific combination of anionic surfactants provides temperature stability.

Accordingly, in a first aspect the invention relates to a liquid aqueous detergent composition comprising, a. 8 to 30 wt % of a surfactant system comprising,
   i. primary surfactant being anionic surfactant comprising
      a surfactant A of formula I: $(R_1—(OR')_n—O—SO_3^-)_xM^{x+}$,
      wherein:
      $R_1$ is saturated or unsaturated C8-C16 alkyl chain;
      R' is ethylene;
      n is from 1 to 15;
      x is equal to 1 or 2;
      $M^{x+}$ is a suitable cation which provides charge neutrality selected from sodium, calcium, potassium and magnesium; and
      a surfactant B of formula II: $(R_1—O—SO_3^-)_xM^{x+}$,
      wherein:
      $R_1$ is saturated or unsaturated C8-C16 alkyl chain;
      x is equal to 1 or 2;
      $M^{x+}$ is a suitable cation which provides charge neutrality selected from sodium, calcium, potassium and magnesium; and
   ii. secondary surfactant being amphoteric surfactant comprising betaine;
b. 0.001 to 0.2 wt % of polyethylene oxide having a molecular weight higher than 200,000 g/mol;
c. 0.1 to 5 wt % of an inorganic salt selected from the group consisting of sodium chloride, magnesium sulphate, sodium sulphate and combinations thereof;

wherein:
the weight ratio of surfactant A to surfactant B is smaller than or equal to 1.5;
the ratio of average EO of surfactant A and surfactant B combined to total amount of surfactant B is smaller than or equal to 0.45, wherein the average EO is calculated as defined in the description;
the weight ratio of primary surfactant to secondary surfactant is in the range from 4:1 to 8:1; and
the surfactant system is free of alkylbenzene sulphonates and derivatives thereof.

The invention further relates to a method of cleaning a hard surface using the composition of the invention, as well as the use thereof.

DETAILED DESCRIPTION OF THE INVENTION

Any feature of one aspect of the present invention may be utilized in any other aspect of the invention. The word “comprising” is intended to mean “including” but not necessarily “consisting of” or “composed of.” In other words, the listed steps or options need not be exhaustive. Except in the operating and comparative examples, or where otherwise explicitly indicated, all numbers in this description indicating amounts of material or conditions of reaction, physical properties of materials and/or use are to be understood as modified by the word “about”. Numerical ranges expressed in the format “from x to y” are understood to include x and y. When for a specific feature multiple preferred ranges are described in the format “x to y”, it is understood that all ranges combining the different endpoints are also contemplated. Unless specified otherwise, amounts as used herein are expressed in percentage by weight based on total weight of the composition and is abbreviated as “wt %”. The use of any and all examples or exemplary language e.g. “such as” provided herein is intended merely to better illuminate the invention and does not in any way limit the scope of the invention otherwise claimed. Room temperature is defined as a temperature of about 20 degrees Celsius.

Aqueous Detergent Composition

The composition of the present invention is an aqueous cleaning composition, that is to say, the composition comprises water. The amount of water will depend on the desired concentration of the other ingredients. Preferably the composition comprises 60 to 92 wt % water, more preferably not less than 62 w %%, still more preferably not less than 65 wt % but typically not more than 85 wt %, more preferably not more than 80 wt %, still more preferably not more than 75 wt %.

The composition is liquid, that is, it can be poured. Compositions of the present invention preferably have a viscosity in the range of 1000 to 2700 cps at 21 $sec^{-1}$ measured on a Haake Viscometer (Models include VT181, VT501, VT550 or equivalent) with "cup" and "bob" geometry, equipped with a MV cup and a MV2 bob at a controlled temperature of 25° C. Preferably 1500 to 2500 and more preferably 1700 to 2300. Thicker compositions are sometimes preferred by users as these may be easier to dose. For compositions with lower amounts of surfactant, a thick product may also validate appropriate cleaning power perception with users of such compositions.

Surfactant System

The composition of the present invention comprises a surfactant system. The surfactant system comprises at least primary and secondary surfactant wherein the weight ratio of primary surfactant to secondary surfactant is in the range from 4:1 to 8:1. Preferably the weight ratio is from 4:1 to 7:1, more preferably 5:1 to 7:1.

The surfactant system is present in the composition in a concentration of 8 to 30 wt %. Preferably the weight ratio of the surfactant system is 8 to 25 wt %, more preferably 8 to 20 wt % and even more preferably 8 to 15 wt %.

Primary Surfactant

The primary surfactant is an anionic surfactant comprising a surfactant A of the formula (Formula I):

$(R_1—(OR')_n—O—SO_3^-)_xM^{x+}$, wherein:

- $R_1$ is saturated or unsaturated C8-C16, preferably C12-C14 alkyl chain; preferably, $R_1$ is a saturated C8-C16, more preferably a saturated C12-C14 alkyl chain;
- R' is ethylene;
- n is from 1 to 15, preferably from 1 to 10, more preferably from 1 to 5, even more preferably from 1 to 3;
- x is equal to 1 or 2;
- $M^{x+}$ is a suitable cation which provides charge neutrality, preferably sodium, calcium, potassium, or magnesium, more preferably a sodium cation.

Preferably, the primary surfactant comprises as surfactant A sodium lauryl ether sulphate having 1 to 3 ethylene oxide units per molecule, more preferably, sodium lauryl ether sulphate having 1 to 2 ethylene oxide units per molecule.

The primary surfactant further comprises a surfactant B of the formula (Formula 11):

$(R_1—O—SO_3^-)_xM^{x+}$, wherein:

- $R_1$ is saturated or unsaturated C8-C16, preferably C12-C14 alkyl chain; preferably, $R_1$ is a saturated C8-C16, more preferably a saturated C12-C14 alkyl chain;
- x is equal to 1 or 2;
- $M^{x+}$ is a suitable cation which provides charge neutrality, preferably sodium, calcium, potassium, or magnesium, more preferably a sodium cation.

Examples of surfactant B include sodium lauryl sulphate. Suitable examples include alkyl sulphates from synthetic origin with trade names Safol 23, Dobanol 23A or 23S, Lial 123 S, Alfol 1412S, Empicol LC3, Empicol 075SR. Further suitable examples, and preferred, include alkyl sulphates commercially available from natural sources with trade names Galaxy 689, Galaxy 780, Galaxy 789, Galaxy 799 SP.

The composition of the present invention will thus comprise a primary surfactant comprising both a surfactant A and a surfactant B.

The weight ratio of surfactant A to surfactant B is smaller than or equal to 1.5. For example, 7 wt % of surfactant A and 5 wt % of surfactant B gives a weight ratio of surfactant A to surfactant B of 1.4. Preferably the weight ratio of surfactant A to surfactant B is smaller than or equal to 1.45, and more preferably smaller than or equal to 1.4. The weight ratio of surfactant A to surfactant B is typically at least 0.2, preferably at least 0.3 and more preferably at least 0.4. A preferred range is from 0.2 to 1.5, more preferred from 0.3 to 1.45, and even more preferred from 0.4 to 1.4.

The ratio of (average EO of surfactant A and surfactant B combined) to (total amount of Surfactant B) is smaller than or equal to 0.45. EO refers to degree of ethoxylation and is expressed as 'n' in Formula I, with 'n' indicating the number of ethylene oxide units per molecule (i.e. the number of EO units). When surfactants according to Formula I are manufactured this will usually result in a mixture of molecules with a certain distribution of the number of EO units. The average EO of such a mixture can be calculated as follows.

The average EO is defined as the weighted mean of the percentages of each EO adduct, with EO number comprised between 0 and 15 (i.e. n=0 and i=15), present in surfactants A and B.

$$\frac{\Sigma_{n=0}^{i} Xnm * EOn}{\Sigma_{n=0}^{i} EOn}$$

Where Xnm is the % of the $n^{th}$ ethoxylation adduct into anionic surfactant m, where m may be either A or B and EOn is the ethoxylation degree of the $n^{th}$ ethoxylation adduct.

For the purpose of the invention the 'average EO of surfactant A and surfactant B combined' means that surfactant B according to Formula II is understood as the non-ethoxylated equivalent of Formula I wherein n=0. Thus, the average EO considers the amount of both surfactant A and surfactant B. The calculation of the average EO corresponds to the calculation method explained above.

Preferably the ratio of (average EO of surfactant A and surfactant B combined) to (total amount of surfactant B) is smaller than or equal to 0.43, and more preferably smaller than or equal to 0.4. Typically, the ratio of (average EO of surfactant A and surfactant B combined) to (total amount of surfactant B) is at least 0.01, like for example at least 0.05 or 0.1. A preferred range is from 0.01 to 0.45, more preferred from 0.05 to 0.43, and even more preferred from 0.1 to 0.4.

It was surprisingly found that such an anionic surfactant system provides for temperature stabilization of detergent compositions comprising polyethylene oxide and betaine, even in the absence of alkylbenzene sulphonates.

Preferably the primary surfactant comprises at least 70 wt %, calculated on total amount of primary surfactant, of surfactant A and surfactant B. More preferably at least 80 wt %, even more preferably at least 90 wt % and still more preferably at least 95 wt %. It may be preferred that the primary surfactant consists of surfactant A and surfactant B.

The primary surfactant may comprise other anionic surfactants such as rhamnolipids, being anionic biosurfactants.

Primary surfactant may be present in a concentration of 5 to 89 wt %, preferably 10 to 85 wt %, more preferably 15 to 80 wt %, even more preferably 20 to 70 wt % and still even more preferably 25 to 60 wt %, by total weight of the surfactant system.

Secondary Surfactant

The secondary surfactant is amphoteric surfactant comprising betaine.

Preferably the secondary surfactant comprises at least 70 wt %, calculated on total amount of secondary surfactant, of betaine. More preferably at least 80 wt %, even more preferably at least 90 wt % and still more preferably at least 95 wt %. It may be preferred that the secondary surfactant consists of betaine.

Secondary surfactant may be present in a concentration of 7 to 20 wt %, preferably 8 to 14 wt % and more preferably 8 to 12.5 wt % by total weight of the surfactant system.

Betaine

The amphoteric surfactant comprises betaine. Suitable betaines include alkyl betaine, alkyl amido betaine, alkyl amidopropyl betaine, alkyl sulphobetaine and alkyl phosphobetaine, wherein the alkyl groups preferably have from 8 to 19 carbon atoms.

Examples include cocodimethyl sulphopropyl betaine, cetyl betaine, laurylamidopropyl betaine, caprylate/caprate betaine, capryl/capramidopropyl betaine, cocamidopropyl hydroxysultaine, cocobutyramido hydroxysultaine, and preferably lauryl betaine, cocamidopropyl betaine and sodium cocamphopropionate. Preferably the betaine is cocamidopropyl betaine (CAPB).

Further Surfactants

The surfactant system of the present invention may comprise other types of surfactants in addition to the anionic surfactant of the primary surfactant and amphoteric surfactant of the secondary surfactant. More specifically the surfactant system may also comprise cationic and/or non-ionic surfactant.

Suitable non-ionic surfactants include the condensation products of a higher alcohol (e.g. an alkanol containing about 8 to 18 carbon atoms in a straight or branched chain configuration) condensed with about 5 to 30 moles of ethylene oxide, for example, lauryl or myristyl alcohol condensed with about 16 moles of ethylene oxide (EO), tridecanol condensed with about 6 moles of EO, myristyl alcohol condensed with about 10 moles of EO per mole of myristyl alcohol, the condensation product of EO with a cut of coconut fatty alcohol containing a mixture of fatty alcohols with alkyl chains varying from 10 to about 14 carbon atoms in length and wherein the condensate contains either about 6 moles of EO per mole of total alcohol or about 9 moles of EO per mole of alcohol and tallow alcohol ethoxylates containing 6 EO to 11 EO per mole of alcohol. Particularly preferred is Lauryl alcohol condensed with 5, 7 and 9 moles of ethylene oxide (Laureth 5, Laureth 7 and Laureth 9). Preferably, the non-ionic surfactant is selected from Laureth 5, Laureth 7 and Laureth 9, or mixtures thereof.

Condensates of 2 to 30 moles of ethylene oxide with sorbitan mono- and tri-C10-C20 alkanoic acid esters having a HLB of 8 to 15 also may be employed as the nonionic surfactant. These surfactants are well known and are available from Imperial Chemical Industries under the Tween trade name. Suitable surfactants include polyoxyethylene (4) sorbitan monolaurate, polyoxyethylene (4) sorbitan monostearate, polyoxyethylene (20) sorbitan trioleate and polyoxyethylene (20) sorbitan tristearate.

Another nonionic surfactant that may be employed are alkyl polyglycosides. These may be preferred as these have because of their environmentally friendly profile.

When present, the non-ionic surfactant is in a concentration of 0.1 to 5% by weight, preferably at least 0.3%, still more preferably at least 0.5% but preferably not more than 4%, more preferably not more than 3%, even more preferably not more than 2% by weight of the surfactant system.

Some surfactants are known to have other functions as well and are sometimes classified as such although it is commonly known that such ingredients are also surfactants. For example, benzalkonium chloride (BKC) is a known cationic surfactant that can also be employed as an antimicrobial agent. For the purpose of the present invention such ingredients are taken into account for the calculation of weight percentages of surfactant.

Alkylbenzene Sulphonates (ABS)

ABS is not readily available from renewable carbon or biorenewable carbon sources. Therefore, the surfactant system of the present composition is free of alkylbenzene sulphonates and derivatives thereof.

Alkylbenzene sulphonates (ABS) and derivatives thereof include water-soluble alkali metal salts of organic sulphonates having alkyl radicals typically containing from about 8 to about 22 carbon atoms, preferably 8 to 18 carbon atoms, still more preferably 12 to 15 carbon atoms and may be saturated or unsaturated. Examples include sodium salt of linear alkylbenzene sulphonate, alkyl toluene sulphonate, alkyl xylene sulphonate, alkyl phenol sulphonate, alkyl naphthalene-sulphonate, ammonium diamylnaphthalene-sulphonate and sodium dinonylnaphthalene-sulphonate and mixtures with olefin sulphonates.

Preferably the surfactant system of the composition of the present invention is free of any sulphonated surfactant.

Polyethylene Oxide

The liquid detergent composition of the present invention comprises polyethylene oxide having a molecular weight higher than 200,000 g/mol. The polyethylene oxide may be present as a single compound or a mixture of at least two polyethylene oxides having a molecular weight higher than 200,000 g/mol.

As used herein, 'polyethylene oxide' refers to polyethylene oxides (PEO) or high molecular weight polyethylene glycols (PEGs). As used herein, 'high molecular weight polyethylene glycol' means a linear homopolymer derived from ethylene oxide and having a molecular weight of at least 200,000 g/mol.

Preferably, the polyethylene oxide has a molecular weight of 300,000 g/mol to 4,000,000 g/mol, more preferably 500,000 g/mol to 3,000,000 g/mol, even more preferably 1,000,000 to 2,000,000 g/mol.

Suitable examples include, but are not limited to, polyethylene oxides commercially available with trade names WSR N-10, WSR N-80, WSR N-750, WSR 205, WSR 1105, WSR N-12K, WSR N-60K, WSR-301, WSR-303, WSR-308, all from The Dow Chemical Company; polyethylene oxide (PEO) from MSE, Beantown chemicals or Acros Organics; PEO 100K from Polysciences; PEO-1, PEO2, PEO-3, PEO-4, PEO-8, PEO15, PEO-18, PEO-57, PEO-29 from Sumitomo Seika Chemicals Ltd.; or ALKOX polyethylene Glycol from Meisei Chemical Works.

The polyethylene oxide is present in an amount of 0.001 to 0.2 wt % based on the total weight of the composition. Preferably, the polyethylene oxide is present in an amount of 0.01 to 0.18, more preferably 0.1 to 0.15 wt %.

Inorganic Salts

The composition comprises 0.1 to 5% by weight of an inorganic salt selected from the group consisting of sodium chloride, magnesium sulfate, sodium sulfate and combinations thereof. Inorganic salts advantageously control the viscosity of the detergent compositions.

Preferably, liquid detergent composition comprises 0.5 to 4%, more preferably 1.0 to 3%, even more preferably 1.5 to 2.5% by weight of an inorganic salt.

pH of the Composition

Preferably the pH of the composition of the present invention is between 4.0 to 8.0. Preferably, the pH is 4.5 and 7.5, preferably between 4.5 and 7.0, more preferably between 5.0 and 6.5.

Optional Ingredients

The composition according to the invention may contain other ingredients which aid in the cleaning or sensory performance. Compositions according to the invention can also contain, in addition to the ingredients already mentioned, various other optional ingredients such as thickeners, colorants, preservatives, fatty acids, anti-microbial agents, perfumes, pH adjusters, sequestrants, alkalinity agents and hydrotropes.

Organic Solvents

Preferred compositions do not contain large amounts of organic solvents, usually added to boost cleaning performance, that is from 0 to 1 wt % organic solvent. Preferably the composition is free of organic solvents.

Silicones

Compositions of the present invention preferably comprise only limited amounts of silicones as these may not provide the required user characteristics for cleaning compositions of the present invention. Silicones may for example leave a 'slippery' feel to the hard surface. Therefore, the composition of the present invention preferably comprises from 0 to 1 wt %, more preferably from 0 to 0.5 wt % and still more preferably from 0 to 0.1 wt % silicones. Still more preferably the composition is free of silicones.

Product Format

The composition may be used neat or diluted. For hard surface cleaning or more specifically for dishwashing purposes, the composition is typically applied neat directly to the surface or on an implement like for example a sponge or cloth. When applied in a diluted form, the composition is preferably diluted with water in a ratio of between 1:1 to 1:100 and more preferably in a ratio of between 1:1 to 1:10.

The composition may be packaged in the form of any commercially available bottle for storing the liquid.

The bottle containing the liquid can be of different sizes and shapes to accommodate different volumes of the liquid; preferably between 0.25 and 2 L, more preferably between 0.25 and 1.5 L or even between 0.25 and 1 L. The bottle is preferably provided with a dispenser, which enables the consumer an easier mode of dispersion of the liquid. Spray or pump-dispensers may also be used.

Process

The invention also relates to a method of cleaning a hard surface comprising the steps of:

a. contacting the hard surface, optionally in diluted form, with the liquid detergent composition according to the present invention, and
b. removing the detergent composition from the hard surface, optionally by rinsing with water.

The method can be performed manually (e.g. cleaning by hand) or in a cleaning device, such as an industrial or at home dishwashing machines. Preferably, the method of cleaning is a manual cleaning, more preferably hand dishwashing.

'Hard surface', as used herein, typically means utensils or kitchenware, kitchen worktops, kitchen floors, sinks and kitchen counter tops, floors and bathrooms.

In a further aspect, the invention relates to the use of a liquid detergent composition of the invention for handwashing hard surfaces, preferably dishware.

In any of the processes above, the composition of the invention is applied onto a hard surface in neat or diluted form. The composition may be applied by any known ways such as by using a cleaning implement, such as scrub, sponge paper, cloth, wipes or any other direct or indirect application. The applied composition may be cleaned using a cleaning implement such as a scrub, sponge, paper, cloth or wipes with or without water, or rinsed off with water, optionally running water.

The invention will now be illustrated by means of the following non-limiting examples.

EXAMPLES

Temperature Stability Test Protocol

The appearance of the composition was assessed by visual inspection at 25° C. and judged either clear or not clear. The term 'clear' it is defined as transparent, not opaque or hazy, under visual inspection. The assessment is conducted after a period up to 12 weeks during which the said composition is stored at a temperature between 0° C. and 37° C.

Example 1

Formulations according to Table 1 were prepared. All formulations had a pH of about 6 obtained by using citric acid and sodium hydroxide as needed. The temperature stability was tested using the protocol described above. The stability test results and parameter values are shown in Table 2.

TABLE 1

(wt % calculated on total product)

| Ingredients | 1 | 2 | 3 | 4 | 5 | 6 | 7 |
|---|---|---|---|---|---|---|---|
| Sodium C12-C14 fatty alcohol ether sulphate with average EO of 2.14 | 6.35 | — | — | — | — | — | — |
| Sodium C12-C14 fatty alcohol ether sulphate with average EO of 3.94 | — | 9.3 | 7.56 | 6.41 | 5.83 | 5.25 | 3.52 |
| Sodium lauryl sulphate | 4.59 | 1.64 | 3.38 | 4.53 | 5.11 | 5.69 | 7.42 |
| Cocamidopropyl betaine | 1.86 | 1.86 | 1.86 | 1.86 | 1.86 | 1.86 | 1.86 |

TABLE 1-continued

| (wt % calculated on total product) | | | | | | | |
|---|---|---|---|---|---|---|---|
| Ingredients | 1 | 2 | 3 | 4 | 5 | 6 | 7 |
| Polyethylene oxide [1] | 0.05 | 0.05 | 0.05 | 0.05 | 0.05 | 0.05 | 0.05 |
| Sodium sulphate | 1.75 | 3 | 3 | 3 | 3 | 3 | 3 |
| Water | | | | To 100 | | | |

[1] PEG 45-M. Mw: 2,000,000 g/mol (DOW, Sigma)

TABLE 2

| temperature stability test results and parameter values | | | | | | | |
|---|---|---|---|---|---|---|---|
| Parameter | 1 | 2 | 3 | 4 | 5 | 6 | 7 |
| weight ratio surfactant A to B | 1.38 | 5.67 | 2.24 | 1.42 | 1.14 | 0.92 | 0.47 |
| average EO of surfactant A and surfactant B combined | 1.24 | 3.34 | 2.71 | 2.3 | 2.09 | 1.88 | 1.26 |
| ratio AVG EO to total surfactant B # | 0.27 | 2.04 | 0.8 | 0.51 | 0.41 | 0.33 | 0.17 |
| weight ratio primary to secondary surfactant | 5.88 | 5.88 | 5.88 | 5.88 | 5.88 | 5.88 | 5.88 |
| Viscosity @21 s − 1(mPas) | 2270 | 2200 | 1010 | 2750 | 3740 | 4660 | 2040 |
| Appearance (clear/not clear) | clear | not | not | not | clear | clear | clear |

# ratio of (average EO of surfactant A and surfactant B combined) to (total amount of surfactant B)

Example 2

Formulations according to Table 3 were prepared. All formulations had a pH of about 6 obtained by using citric acid and sodium hydroxide as needed. The temperature stability was tested using the protocol described above. The stability test results and parameter values are shown in Table 4.

TABLE 3

| (wt % calculated on total product) | | | | | | | | |
|---|---|---|---|---|---|---|---|---|
| Ingredients | 8 | 9 | 10 | 11 | 12 | 13 | 14 | 15 |
| Sodium C12-C14 fatty alcohol ether sulphate with average EO of 2.14 | 6.35 | — | — | — | — | — | — | — |
| Sodium C12-C14 fatty alcohol ether sulphate with average EO of 3.94 | — | 9.3 | 8.02 | 7.89 | 7.17 | 6.32 | 5.9 | 5.05 |
| Sodium lauryl sulphate | 4.59 | 1.64 | 2.92 | 3.05 | 3.77 | 4.62 | 5.04 | 5.89 |
| Cocamidopropyl betaine | 1.86 | 1.86 | 1.86 | 1.86 | 1.86 | 1.86 | 1.86 | 1.86 |
| Polyethylene oxide [1] | 0.05 | 0.05 | 0.05 | 0.05 | 0.05 | 0.05 | 0.05 | 0.05 |
| Sodium sulphate | 1.75 | 3 | 1.75 | 1.75 | 1.75 | 1.75 | 1.75 | 1.75 |
| Water | | | | | To 100 | | | |

[1] PEG 45-M. Mw: 2,000,000 g/mol (DOW, Sigma)

TABLE 4

| temperature stability test results and parameter values | | | | | | | | |
|---|---|---|---|---|---|---|---|---|
| Parameter | 8 | 9 | 10 | 11 | 12 | 13 | 14 | 15 |
| weight ratio surfactant A to B | 1.38 | 5.67 | 2.75 | 2.59 | 1.9 | 1.37 | 1.17 | 0.86 |
| average EO of surfactant A and surfactant B combined | 1.24 | 3.34 | 2.88 | 2.83 | 2.57 | 2.27 | 2.11 | 1.81 |
| ratio AVG EO to total surfactant B # | 0.27 | 2.04 | 0.99 | 0.93 | 0.68 | 0.49 | 0.42 | 0.31 |
| weight ratio primary to secondary surfactant | 5.88 | 5.88 | 5.88 | 5.88 | 5.88 | 5.88 | 5.88 | 5.88 |

TABLE 4-continued

| temperature stability test results and parameter values | | | | | | | | |
|---|---|---|---|---|---|---|---|---|
| Parameter | 8 | 9 | 10 | 11 | 12 | 13 | 14 | 15 |
| Viscosity @21 s − 1(mPas) | 2270 | 2200 | $ | $ | $ | 150 | 187 | 257 |
| Appearance (clear/not clear) | clear | not | not | not | not | not | clear | clear |

# ratio of (average EO of surfactant A and surfactant B combined) to (total amount of surfactant B);
$ water thin

The invention claimed is:

1. A liquid aqueous detergent composition comprising, a. 8 to 30 wt % of a surfactant system comprising, i. primary surfactant being anionic surfactant comprising a surfactant A of formula I: $(R_1—(OR')_n—O—SO_3^-)_xM^{x+}$, wherein:

$R_1$ is saturated or unsaturated $C_8$-$C_{16}$ alkyl chain;

R' is ethylene;

n is from 1 to 15;

x is equal to 1 or 2;

$M^{x+}$ is a suitable cation which provides charge neutrality selected from sodium, calcium, potassium and magnesium; and a surfactant B of formula II: $(R_1—O—SO_3^-)_xM^{x+}$, wherein:

$R_1$ is saturated or unsaturated $C_8$-$C_{16}$ alkyl chain;

x is equal to 1 or 2;

$M^{x+}$ is a suitable cation which provides charge neutrality selected from sodium, calcium, potassium and magnesium; and ii. secondary surfactant being amphoteric surfactant comprising betaine;

b. 0.001 to 0.2 wt % of polyethylene oxide having a molecular weight higher than 200,000 g/mol;

c. 0.1 to 5 wt % of an inorganic salt selected from the group consisting of sodium chloride, magnesium sulphate, sodium sulphate and combinations thereof;

wherein:

the weight ratio of surfactant A to surfactant B is smaller than or equal to 1.5;

the ratio of average EO of surfactant A and surfactant B combined to total amount of surfactant B is smaller than or equal to 0.45;

the weight ratio of primary surfactant to secondary surfactant is in the range from 4:1 to 8:1; and the surfactant system is free of alkylbenzene sulphonates and derivatives thereof; and wherein the average EO is defined as the weighted mean of the percentages of each EO adduct, with EO number comprised between 0 and 15 present in surfactants A and B, $$\frac{\Sigma_{n=0}^{i} Xnm * EOn}{\Sigma_{n=0}^{i} EOn}$$

wherein Xnm is the % of the $n^{th}$ ethoxylation adduct into anionic surfactant m, where m may be either A or B and EOn is the ethoxylation degree of the $n^{th}$ ethoxylation adduct.

2. The composition according to claim 1, wherein the primary surfactant comprises sodium lauryl ether sulphate having 1 to 2 ethylene oxide units per molecule.

3. The composition according to claim 1, wherein the weight ratio of surfactant A to surfactant B is smaller than or equal to 1.45.

4. The composition of claim 1, wherein the ratio of (average EO of surfactant A and surfactant B combined) to (total amount of surfactant B) is smaller than or equal to 0.43.

5. The composition according claim 1, wherein the secondary surfactant comprises betaine selected from alkyl betaine, alkyl amido betaine, alkyl amidopropyl betaine, alkyl sulphobetaine, alkyl phosphobetaine and combinations thereof.

6. The composition according to claim 5, wherein the betaine is cocamidopropyl betaine (CAPB).

7. The composition according to claim 1, wherein the weight ratio of primary surfactant to secondary surfactant is in the range from 4:1 to 7:1.

8. The composition according to claim 1, wherein the amount of surfactant system is from 8 to 25 wt %.

9. The composition according to claim 1, wherein the polyethylene oxide has a molecular weight of 500,000 g/mol to 3,000,000 g/mol.

10. The composition according to claim 1, wherein the composition has a pH in the range of 4 to 8.

11. The composition according to claim 1, wherein the composition has a viscosity in the range of 1000 to 2700 cps at 21 $sec^{-1}$ measured on a Haake Viscometer (Models include VT181, VT501, VT550 or equivalent) with "cup" and "bob" geometry, equipped with a MV cup and a MV2 bob at a controlled temperature of 25° C.

12. A method of cleaning a hard surface comprising the steps:

a. contacting the hard surface, optionally in diluted form, with the liquid detergent composition according to claim 1, and b. removing the detergent composition from the hard surface, optionally by rinsing with water.

13. The method of cleaning according to claim 12, wherein the hard surface is dishware.

* * * * *